(12) United States Patent
Mahieu et al.

(10) Patent No.: US 8,419,422 B2
(45) Date of Patent: Apr. 16, 2013

(54) METHOD OF MONITORING AN EXHAUST FUMES MAIN LINKING A CARBON BLOCK BAKING FURNACE TO A FUME TREATMENT

(75) Inventors: Pierre Mahieu, Lyons (FR); Thierry Malard, L'isle-Adam (FR)

(73) Assignees: Solios Environnement, Saint Germain en Laye (FR); Solios Carbone, Givors (FR)

( * ) Notice: Subject to any disclaimer, the term of this patent is extended or adjusted under 35 U.S.C. 154(b) by 778 days.

(21) Appl. No.: 12/667,212

(22) PCT Filed: Jun. 27, 2008

(86) PCT No.: PCT/FR2008/051181
§ 371 (c)(1),
(2), (4) Date: Dec. 29, 2009

(87) PCT Pub. No.: WO2009/007613
PCT Pub. Date: Jan. 15, 2009

(65) Prior Publication Data
US 2010/0183994 A1    Jul. 22, 2010

(30) Foreign Application Priority Data
Jun. 29, 2007  (FR) ..................... 07 04709

(51) Int. Cl.
*F27B 1/28*    (2006.01)
(52) U.S. Cl.
USPC ........................................................ 432/192
(58) Field of Classification Search .................. 432/192, 432/193
See application file for complete search history.

(56) References Cited

U.S. PATENT DOCUMENTS

| | | | | |
|---|---|---|---|---|
| 4,269,592 A * | 5/1981 | Benton et al. | ................... | 432/19 |
| 4,270,898 A | 6/1981 | Kelly | | |
| 4,371,333 A * | 2/1983 | Moser et al. | ...................... | 432/3 |
| 4,382,778 A * | 5/1983 | Peacey et al. | ................... | 432/18 |
| 4,687,439 A * | 8/1987 | Olivarez et al. | ............... | 432/192 |
| 4,727,748 A | 3/1988 | Horigome et al. | | |
| 4,859,175 A * | 8/1989 | Dreyer et al. | ...................... | 432/4 |
| 2010/0254874 A1 * | 10/2010 | Mahieu et al. | ................. | 423/247 |

FOREIGN PATENT DOCUMENTS

| | | |
|---|---|---|
| EP | 0 188 911 A | 7/1986 |
| EP | 0 252 856 A | 1/1988 |
| FR | 2 887 782 | 1/2007 |
| JP | 56 079230 A | 6/1981 |

OTHER PUBLICATIONS

International Search Report for related international application No. PCT/FR2008/051181, report dated Nov. 26, 2008.

* cited by examiner

*Primary Examiner* — Gregory A Wilson
(74) *Attorney, Agent, or Firm* — Miller, Matthias & Hull LLP (57) ABSTRACT

The method of the invention is used for monitoring the state of a smoke duct connecting each suction rail of a baking furnace (FAC) for carbonated blocks, of the rotating fire type and preferably with open chambers or covered chambers, to a smoke processing center (CTF) for purifying the baking smoke from the FAC, wherein said smoke is drawn through at least one suction rail of the FAC and collected in the smoke duct feeding said smoke to the CTF, the method including at least the step of detecting a leak in the smoke duct consisting of parasitic inlets of ambient air into said duct and/or at least the step of detecting a fire in said duct.

13 Claims, 3 Drawing Sheets

METHOD OF MONITORING AN EXHAUST
FUMES MAIN LINKING A CARBON BLOCK
BAKING FURNACE TO A FUME
TREATMENT

CROSS-REFERENCE TO RELATED APPLICATIONS

This application is a U.S. national stage filing of International Patent Application No. PCT/FR2008/051181 filed on Jun. 27, 2008, which claims priority under the Paris Convention to French Application No. 07 04709, filed on Jun. 29, 2007.

FIELD OF THE DISCLOSURE

The invention relates to the field of baking carbonaceous blocks intended for electrometallurgy, and more particularly baking carbon anodes and cathodes intended for the electrolytic production of aluminium, and the invention relates more particularly to a method of monitoring the condition of an exhaust fumes main linking each exhaust manifold of a baking furnace, hereafter referred to as BF, of said carbonaceous blocks, to a fume treatment centre, hereafter referred to as FTC, intended for scrubbing the baking fumes originating from the BF, which is a baking furnace of the "ring" type and, preferably, "open top" or "closed", the baking fumes of which are extracted by at least one exhaust manifold of the BF and collected in said fume main conveying the fumes to the FTC.

BACKGROUND OF THE DISCLOSURE

The FTC is also of a well known type, comprising a tower for cooling fumes by spraying water into said fumes at the outlet of said fume main, and at least one reactor for the physico-chemical neutralization of the fumes by putting the fumes in contact with a powder reagent, such as alumina, then filtering the loaded reagent, in particular by adsorption of fluorinated compounds following contact with the fumes and filtration of the fume dust, and recycling in said reactor of at least one fraction of the filtered reagent and mixing of this with fresh reagent.

It is known that the anodes and cathodes used for aluminium electrolysis are carbon blocks necessary to the chemical reaction of electrolysis of alumina ($Al_2O_3$) in order to obtain aluminium (Al). The base materials used in the production of such anodes or cathodes are calcined petroleum coke constituting the aggregates, and coal pitch, used as a liquid binder. Green blocks are first produced by intensive mixing of the base materials and compaction in order to shape the paste formed from these two main constituents and then baked for approximately one hundred hours at a temperature of the order of 1100° C. The effect of this heat treatment is to transform the coal pitch into coke and consequently to confer on the anodes and cathodes satisfactory mechanical resistance and electrical conductivity for their use in an electrolysis cell.

These green carbonaceous blocks are baked in baking furnaces of a well-known type, called a "ring pit furnace" or "ring furnace" which are used so as to implement the principle of a counter-current gas-solid heat exchanger.

Baking furnaces (BF) for anodes are described in particular in the following patent documents: U.S. Pat. No. 4,859,175, WO 91/19147, U.S. Pat. No. 6,339,729, U.S. Pat. No. 6,436,335 and CA 2 550 880, to which reference will be made for further details in this regard. A reminder of their structure and operation will nevertheless be given, with reference to FIGS. 1 and 2 hereafter, representing respectively a diagrammatic plan view of an open top ring furnace, having two fires in this example, for FIG. 1, and a partial perspective view with cutaway, showing the internal structure of such a furnace, for FIG. 2.

The baking furnace (BF) 1 comprises two parallel shells or sections 1a and 1b, extending along the longitudinal axis XX over the length of the furnace and each comprising a succession of transverse chambers 2 (perpendicular to the axis XX), separated from each other by transverse walls 3. Lengthwise, i.e. in the transverse direction of the furnace 1, each chamber 2 is constituted by alternately juxtaposed pits 4, open at their upper part in order to allow for the loading of the carbonaceous blocks to be baked and the unloading of the cooled baked blocks, and in which the carbonaceous blocks 5 are stacked for baking, packed in a carbonaceous powder, and thin heating flue walls 6. The flue walls 6 of a chamber 2 run on longitudinally (parallel to the major axis XX of the furnace 1) from the flue walls 6 of the other chambers 2 of the same section 1a or 1b and the flue walls 6 communicate with each other by apertures 7 in the upper part of their longitudinal walls, opposite longitudinal passages arranged at this level in the transverse walls 3, such that the flue walls 6 form rows of longitudinal compartments, arranged parallel to the major axis XX of the furnace and in which gaseous fluids (combustion air, combustible gases and combustion gases and fumes) will flow, making it possible to ensure the pre-heating and baking of the anodes 5. The flue walls 6 comprise moreover a device 8 for extending and more uniformly distributing the path of the combustion gases or fumes, and these flue walls 6 are provided, in their upper part, with openings 9, called "ports", capable of being closed by removable covers.

The two sections 1a and 1b of the furnace 1 communicate at their longitudinal ends by crossovers 10, which make it possible to transfer the gaseous fluids from one section to the other, and sometimes even from the end of a group of rows of flue walls 6 of one section 1a or 1b to the corresponding end of the group of rows of flue walls 6 of the other section 1b or 1a.

The operating principle of ring furnaces, also called "fire advance furnaces" consists of causing a flame front to move from one chamber 2 to another that is adjacent thereto during one cycle, each chamber 2 successively undergoing phases of preheating, forced heating, full firing, then cooling (natural then forced).

Figure 1:
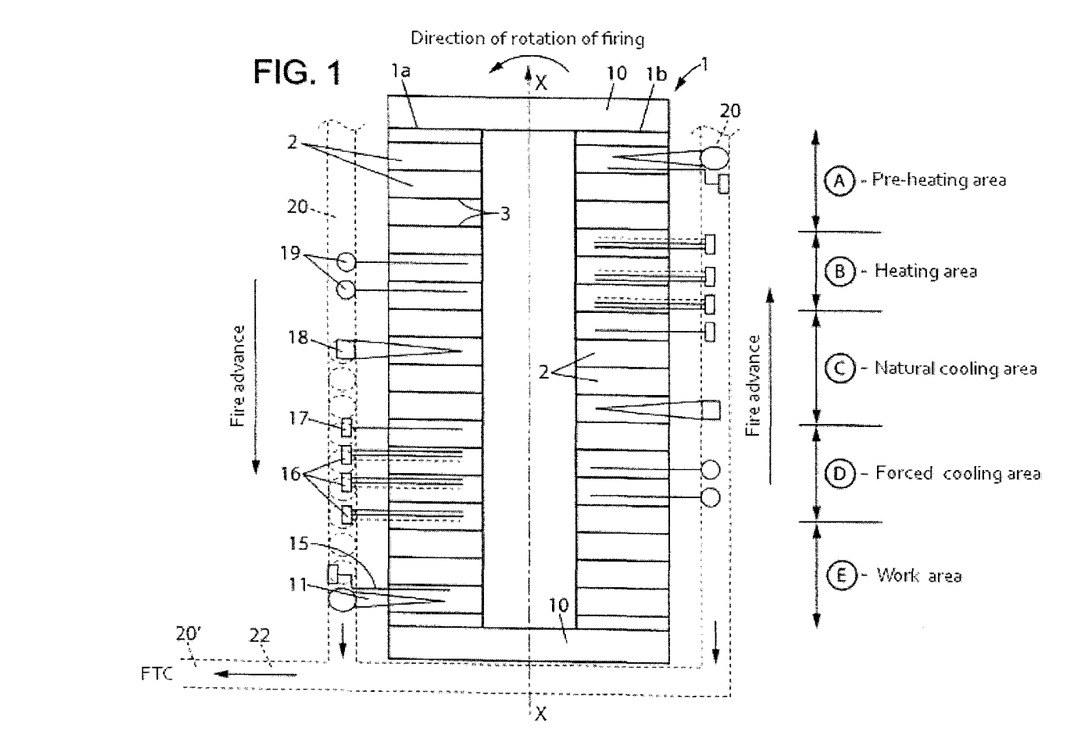
FIGS. 1 and 2 are diagrammatic views, respectively a plan view and a partial perspective view with cutaway, of a BF of the type to which the invention relates, which have already been described above.
Figure 2:
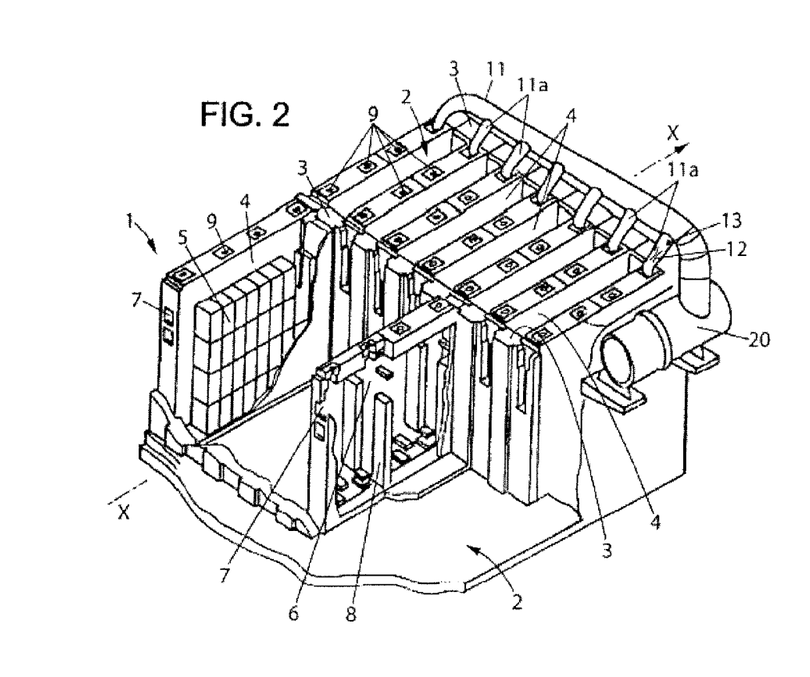

Baking of the anodes 5 is carried out by one or more fires or fire groups, which move cyclically from chamber to chamber (in the direction indicated by the arrows) as shown in FIG. 1 (two fire groups being shown). Each fire or fire group is made up of five successive areas A to E, which are as shown in FIG. 1, from downstream to upstream in relation to the direction of flow of the gaseous fluids in the rows of flue walls 6, and in the opposite direction to the cyclical chamber-to-chamber movements:

A) A pre-heating area comprising, with reference to the fire of section 1a and taking account of the direction of rotation of firing indicated by the arrow at the level of the crossover 10 at the end of furnace 1 at the top of FIG. 1:

an exhaust manifold 11 equipped, for each flue wall 6 of the chamber 2 above which this exhaust manifold extends, a system for measuring and regulating the flow rate of the combustion gases and fumes by row of flue walls 6, this system being capable of comprising, in each exhaust pipe 11a which is integral with the exhaust manifold 11 and opening out into the latter on the one hand, and on the other hand engaged in the opening 9 of one respectively of the flue walls 6 of this chamber 2, an adjustable flap pivoted by a flap actuator in order to adjust the flow rate, as well as a flow meter 12, for example of the "Venturi tube" type, and a temperature sensor (thermocouple) 13 for measuring the temperature of the combustion fumes at the exhaust (the flow meter 12 and the thermocouple 13 are only shown in one manifold 11a in FIG. 2 for the sake of clarity); and a pre-heating measurement ramp 15, situated upstream of the exhaust manifold 11, generally above the same chamber 2, and equipped with temperature sensors (thermocouples) and pressure sensors for measuring the static negative pressure and the temperature prevailing in each of the flue walls 6 of this chamber in order to be able to display and regulate such negative pressure and temperature of the pre-heating area;

B) A heating area comprising:

several identical heating ramps 16, two or preferably three, as shown in FIG. 1; each equipped with fuel injectors (liquid or gaseous), optionally burners, and temperature sensors (thermocouples), each of the ramps 16 extending above one of the chambers respectively of a corresponding number of adjacent chambers 2, such that the injectors of each heating ramp 16 are engaged in the openings 9 of the flue walls 6 in order to inject the fuel therein;

C) a blowing or natural cooling area comprising:

a so-called "zero point" ramp 17, extending above the chamber 2 immediately upstream of the one below the furthest upstream heating ramp 16, and equipped with pressure sensors for measuring the static pressure prevailing in each of the flue walls 6 of this chamber 2, in order to be able to adjust this pressure as indicated hereafter, and a blowing ramp 18, equipped with electric fans provided with a device allowing for the adjustment of the flow of ambient air blown into each of the flue walls 6 of a chamber 2 upstream of the one situated under the zero point ramp 17, so that the flows of ambient air blown into these flue walls 6 can be regulated so as to obtain a desired pressure (slight positive or negative pressure) at the zero point ramp 17;

D) A forced cooling area, which extends typically over three chambers 2 upstream of the blowing ramp 18, and which comprises, in this example, two parallel cooling ramps 19, each equipped with electric fans and blowing pipes blowing ambient air into the flue walls 6 of the corresponding chamber 2; and E) A work area, extending upstream of the cooling ramps 19 and allowing for the loading and unloading of the anodes 5, and the maintenance of the chambers 2.

The heating of the furnace 1 is thus ensured by the heating ramps 16, the injectors of which are introduced, via the apertures 9, into the flue walls 6 of the chambers 2 concerned. Upstream of the heating ramps 16 (relative to the direction of fire advance and the direction of circulation of the air and combustion gases and fumes in the rows of flue walls 6), the blowing ramp 18 and the cooling ramp(s) 19 comprise pipes blowing in cooling and combustion air fed by the electric fans, these pipes being connected, via the apertures 9, to the flue walls 6 of the chambers 2 concerned. Downstream of the heating ramps 16, the exhaust manifold 11 is provided for extracting the combustion gases and fumes, denoted as a whole by the term "combustion fumes", circulating in the rows of flue walls 6.

The heating and baking of the anodes 5 are carried out both by combustion of the (gaseous or liquid) fuel injected, in a controlled fashion, by the heating ramps 16, and, to a substantially equal extent, by the combustion of volatile components of pitch (such as polycyclic aromatic hydrocarbons) diffused by the anodes 5 in the pits 4 of the chambers 2 in preheating and heating areas, these volatile components, a large part of which is combustible, diffused in the pits 4, being capable of flowing in the two adjacent flue walls 6 through degassing gaps arranged in these flue walls in order to ignite in these two flue walls, using the residual combustion air present at this level in the combustion fumes in these flue walls 6.

Thus the circulation of the air and combustion fumes takes place along the rows of flue walls 6, and a negative pressure imposed downstream of the heating area B by the exhaust manifold 11 at the downstream end of the pre-heating area A makes it possible to control the flow of combustion fumes inside the flue walls 6, while a part of the air originating from the cooling areas C and D, via the cooling ramps 19, and the blown air originating from the blowing ramp 18 is preheated in the flue walls 6, cooling the baked anodes 5 in the adjacent pits 4 on its journey, and acts as an oxidant when it reaches the heating area B.

As the baking of the anodes 5 progresses, all of the manifolds and ramps 11 to 19 (with the exception of the two heating ramps 16 that are downstream—before moving—relative to the direction of the fire, since the 3 ramps 16 advance in "caterpillar" fashion, the upstream ramp 16 becoming the downstream manifold of the 3 ramps 16) and the associated measurement and recording equipment and apparatus are advanced cyclically (for example approximately every 24 hours) by one chamber 2, each chamber 2 thus successively providing, downstream of the pre-heating area A, a function of charging the green carbonaceous blocks 5, then, in the pre-heating area A, a function of naturally preheating the blocks 5 by the fuel combustion fumes and pitch vapours that leave the pits 4, entering the flue walls 6, taking account of the negative pressure in the flue walls 6 of the chambers 2 in pre-heating area A, then, in the heating area B or baking area, a function of heating the blocks 5 to approximately 1100° C., and finally, in the cooling areas C and D, a function of cooling the baked blocks 5 by ambient air and, correspondingly, preheating this air constituting the oxidant of the furnace 1, the forced cooling area D being followed, in the direction opposite to the direction of fire advance and circulation of the combustion fumes, by an unloading area E of the cooled carbonaceous blocks 5, then optionally loading of the green carbonaceous blocks in the pits 4.

The method of regulating the BF 1 essentially comprises regulating the temperature and/or pressure of the preheating A, heating B and blowing or natural cooling C areas of the furnace 1, as well, possibly, as steps of optimization of combustion by adjustment of the injection of the fuel by the heating ramps 16, depending on the CO content of the combustion fumes, as measured in the exhaust manifold 11 by at least one CO analyzer-detector provided in at least one of the exhaust pipes 11a.

In order to ensure the control and monitoring of the BF 1, the instrumentation and control system of the latter can comprise two levels. The first can extend to the set of manifolds and ramps 11 to 19, equipped with sensors and actuators driven by programmable logic controllers, as well as a workshop local network for communication between the logic controllers, as well as for data exchange between the first level and the second, which comprises a central system of computers with their peripheral devices, allowing for communication with the first level, supervision of all of the fires, central regulation of the BF 1, entry of set point rules, management of baking data histories, event management, and storage and production of end-of-baking reports.

Each fire is regulated by row of flue walls 6 from the blowing ramp 18 to the exhaust manifold 11, and, for each row of flue walls 6, the regulation is for example carried out by a regulator of the PID (proportional-integral-derivative) type.

Figure 3:
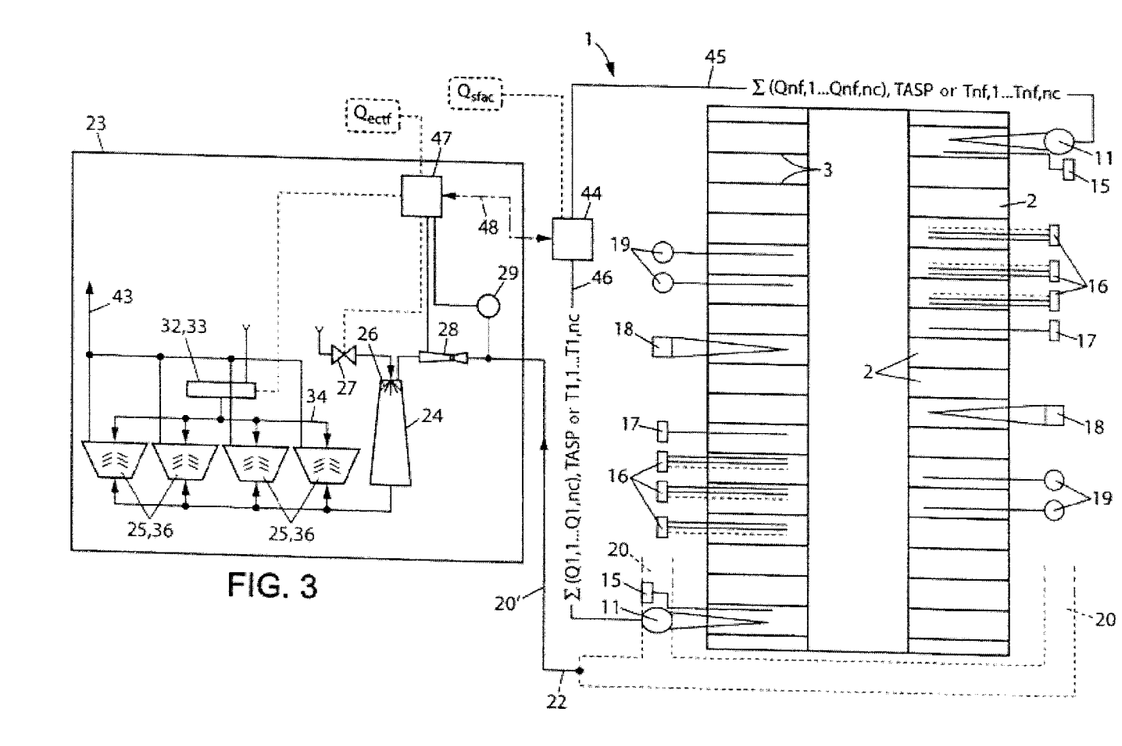
FIG. 3 is a diagrammatic plan view, similar to FIG. 1, of the BF in FIG. 1, the control and regulation system of which cooperates with that of a FTC of the type to which the invention relates and also shown diagrammatically in a plan view in FIG. 3, already substantially described above, for implementing the method of the invention.

The combustion fumes extracted from the fires by the exhaust manifolds 11 are collected in a fume main 20, for example a cylindrical flue partially shown in FIG. 2, which can be U-shaped in plan view (shown in dotted lines in FIG. 1) or which can surround the furnace, and of which the outlet 22 of the part of the flue closest to the furnace conveys the exhausted and collected combustion fumes to a fume treatment centre (FTC) 23, shown diagrammatically in FIG. 3.

The FTC 23 is an installation for scrubbing the fumes from the BF 1 and performs the following functions:
- exhausting the baking fumes emitted by the BF 1, with an almost constant controlled negative pressure,
- cooling the fumes,
- dry scrubbing of these fumes in order to eliminate the fluorine, dusts and tars contained therein, these pollutant elements being captured in a form that allows for them to be recycled in the aluminium electrolysis cells, and
- discharging the scrubbed fumes into the atmosphere.

The dry scrubbing method is based on the capacity of a powder reagent, generally alumina, to provide physico-chemical neutralization of these pollutants by capturing the fluorine and unburned hydrocarbons by adsorption or catchment. The powder alumina is injected into the stream of combustion fumes originating from the BF 1, then retained in filters at the same time as the dusts, after adsorption and/or catchment of the majority of the pollutants: tars, fluorine gas, sulphur dioxide ($SO_2$). The tar filtration efficiency is higher where heavy elements are concerned (having a high molecular weight, therefore easily condensable), while light tars (not condensed) are contained to a lesser extent. The loaded alumina, recovered by emptying the filters, is then recycled in part by being mixed with fresh alumina and reinjected into the stream of fumes originating from the BF 1, and for the remainder by being sent to the aluminium electrolysis cells, where the combustible elements retained in the loaded alumina are burned, and the fluorine recycled in a directly usable form.

The combustion fume scrubbing functions provided by the FTC 23 are, in order:
- cooling, in a cooling tower 24, of the stream of combustion fumes originating from the BF 1,
- supplying at least one reactor 25, but preferably several reactors 25 in parallel, with powder alumina (fresh and recycled),
- injection of alumina into each reactor 25 with distribution in a stream of combustion fumes passing through the reactor,
- catchment-adsorption of the pollutants by the powder alumina distributed in said stream,
- filtration of the loaded alumina from the pollutants and dusts of said stream,
- recycling of the loaded alumina, by cleaning the filters and removal of the loaded alumina.

Cooling the fumes consists of reducing their temperature to approximately 100° C. in order to cause condensation of the heaviest and most dangerous unburned hydrocarbons present in these fumes and reduce the temperature of the fumes to a temperature acceptable by the filtration media. This cooling is carried out by total evaporation of water injected in fine droplets in the tower 24 by sprays, as shown diagrammatically in 26, supplied with water by a valve 27 and with air for spraying by a flue (not shown) opening into the water pipe between the valve 27 and the spray 26. This fine spray makes it possible to obtain total evaporation of the injected water and thus to avoid the formation of hydrofluoric acid (HF) or sulphuric acid ($H_2SO_4$) by condensation on the internal walls of the tower 24. The flow rate of the valve 27 can, in the state of the art, be controlled by a control loop, which is a feedback loop, in order to tend to keep the temperature of the fumes at outlet of the cooling tower 24 aligned on a temperature set point, while the flow rate of the fumes at the intake of the FTC 23 is measured by a flow meter 28, upstream of the cooling tower 24, on the downstream end of an extension 20' of the fume main that provides the link with the FTC 23.

There are several types of the water flow regulator, all of which have the aim of injecting a controlled quantity of water, but which, in order to guarantee a good droplet size, use different principles (regulation of the water pressure and constant air pressure, regulation of both pressures at the same time, regulation of the flow rates, etc.).

The circuit supplying the reactors 25 with fresh alumina comprises principally, from a storage and supply silo upstream, a system for grading 32 and metering 33, the outlet of which is linked to a distribution system 34 (the systems for metering 33 and distribution 34 being capable of being grouped together in a single device) providing the distribution of the fresh alumina in an equal manner to the different reactors 25, each of which is thus supplied with fresh alumina.

Catchment of the tar vapours and fluorine gas by the alumina correspond precisely to the conjunction of two different phenomena, which are a surface mechanical catchment of tar droplets and adsorption of tar vapours and fluorine inside the pores of the alumina particles.

This catchment takes place in the reactors 25, in general vertical and having a cylindrical shape or a circular or rectangular cross section. The alumina is injected into each reactor 25 in the most homogenous fashion possible, in order to reduce the average distance between the molecules to be captured and the alumina grains.

After this injection, filtration of the loaded alumina and dusts is provided by the filter cake which forms in the filters 36 (each of which is shown associated with the corresponding reactor 25), generally produced on fabric filter tubes. The cleaning of the filters 36 by blowing air at low pressure, intermittently and in the opposite direction (counter-current to the stream to be filtered), is controlled by the pressure loss of the filters 36 or by a timer. The loaded alumina falls into a fluidized bed maintained in bins of the filters 36, from where a part of this loaded alumina is then reinjected into the reactors 25 while being mixed with fresh alumina, and a part is discharged by an overflow to a means of handling for removal to a silo for recovery of loaded alumina.

The recycling of loaded alumina in the reactors 25 is implemented in order to increase the efficiency of the catchment function.

The scrubbed fumes leaving the reactors 25-filters 36 are discharged into the atmosphere by a stack 43.

Currently, the control and regulation system 44 for the BF 1 and the monitoring and control system 47 for the FTC 23 operate independently of each other.

The fume (exhaust) main 20-20' is generally a cylindrical steel flue making it possible to extract, by negative pressure, the fumes from the baking of carbonaceous blocks leaving the BF 1 (and extracted by the exhaust manifolds 11 of the active fires), and to convey them to the FTC 23.

The degradation of the fume main 20-20', as well furthermore as the exhaust pipes 11*a* and manifolds 11, can result in infiltration of ambient air, therefore colder than the fumes, reducing the average temperature of the fumes and thus promoting condensation and the deposit of unburned volatile matter and acid residues on the internal face of the walls of the fume main 20-20', in particular.

Such infiltrations of cold air and the possible resultant condensation of a part of the fumes thus promote corrosive action on the metal parts of the fume main 20-20' and the FTC 23.

Moreover, poor sealing of the fume exhaust flues of the BF 1, and in particular the fume main 20-20' also constitutes a significant fire risk factor, not only in the fume main 20-20', but also in the BF 1 and the FTC 23.

The effects of such infiltrations of ambient air and any resulting outbreaks of fire are at the very least, loss of performance and operational disruption, which may even extend to operating losses, when operation of the BF 1 and/or the FTC 23 must be slowed down, as well as the risks of damage and consequent shutdown of the plant in order to carry out any work that may be necessary to repair and make good.

To date, a thorough visual inspection of the different parts of the exhaust ducts of the BF 1 is the only way to detect any unwanted infiltrations of ambient air.

As a general rule, in such installations, preventive inspection and cleaning of the fume main 20-20' up to the FTC 23 are carried out annually, involving a planned shutdown.

However, these annual inspections do not make it possible to eliminate all fire risks linked to a degradation of the fume main 20-20', in the interval between two inspections, or linked to defects undetected during these inspections.

The problem to which the invention relates is to remedy the drawbacks mentioned above and make it possible to prevent the infiltration of ambient air into the fume exhaust flues, and in particular the fume main 20-20', capable of originating deposits of unburned matter by condensation due to the cooling of the fumes, and outbreaks of fire resulting from the fact that the infiltrated air constitutes combustion air that can come into contact with incandescent particles made up of packing coke or pitch volatile matter carried by the fumes, and deposits of pitch volatile matter, generally in the form of heavy tars, which accumulate more or less rapidly over time on the walls of said fume main, leading to loss of performance, operational disruption, even operating losses and damage and in the most extreme cases, shutdowns of the plant made up of a BF 1 connected to a FTC 23 by a fume main 20-20'.

SUMMARY OF THE DISCLOSURE

To this end, the invention proposes a method of monitoring the condition of a fume main connecting each exhaust manifold of a BF as described above to a FTC, also as described above, and intended to scrub the baking fumes originating from the BF and collected in said fume main conveying these fumes to the FTC, the method according to the invention being characterized in that it comprises at least one step of detecting a leak in said fume main, consisting of unwanted intakes of ambient air in said fume main, and/or at least one step of detecting an outbreak of fire in said fume main.

According to a first embodiment of the invention, the detection of leaks in said fume main comprises at least one step of comparing the measured fume flow rates, on the one hand, at the outlet of the BF, and on the other hand, at the intake of the FTC, and deducing therefrom any air flow $\Delta Q$ entering by infiltration into the ring main by calculating the difference between the measured flow rates, such that: $\Delta Q = Q_{ectf} - Q_{sfac}$, where $Q_{sfac}$ is the standardized flow rate of the fumes at the outlet of the BF and $Q_{ectf}$ is the standardized flow rate of the fumes at the intake of the FTC.

When the BF is such, as set out above, that each of the exhaust pipes of each of the exhaust manifolds of the BF is equipped with a flow meter, the first embodiment of the method of the invention, as set out above, advantageously comprises at least one step of measuring $Q_{sfac}$ that consists of adding together the standardized fume flow rates measured in the exhaust pipes of the exhaust manifolds of all the fires of the BF that communicate with the heating flue walls of the chambers of the BF, such that:

$$Qsfac = \sum_{f=1}^{f=nf} \sum_{c=1}^{c=nc} (Qf1 \ldots Qfc),$$

where nf is the number of fires in operation in the BF, nc is the number of heating flue walls per chamber of the BF, and Qfc is the standardized flow rate of heating flue wall n° C. of fire n° F.

According to a variant embodiment of this method, which be used alternatively or cumulatively with the above-mentioned embodiment, the leak detection in said fume main can comprise at least one step of estimating the percentage infiltration (PI) of ambient air in said fume main by the formula:

$$PI = \left(\frac{\Delta Q}{Qsfac}\right) \times 100.$$

In this case, it is furthermore advantageous for the method to comprise in addition at least one step of comparing said estimated percentage infiltration (PI) of ambient air with at least one threshold of infiltration (SI), and to generate an alarm when the estimated percentage of infiltration (PI) is greater than at least one threshold of infiltration (SI) representing a level of infiltration at which it would be necessary to initiate the inspection, maintenance or repair of the ring main.

In order to obtain more relevant information on the criticality of leaks (infiltration of ambient air), it is advantageous for this method to comprise moreover at least one step of monitoring over time of the progress of the gradient of the percentage infiltration (PI) of ambient air, measured at least periodically, and to generate an alarm indicating a leak gradient if the percentage infiltration gradient is positive and increasing over a period of monitoring during which successively calculated PI values are stored chronologically and mutually compared.

In parallel to at least one step of detection of leaks by infiltration of ambient air into said fume main, or subsequent to actual detection of such a leak, the method of the invention can advantageously comprise, moreover, at least one step of detecting an outbreak of fire in said fume main, which itself comprises at least one step of measuring, preferably continuously, the flow rates and temperatures of the fumes at each exhaust manifold of the BF and at the intake of the FTC, and calculating the enthalpy E1 at the end of said fume main linked to the outlet of the BF and the enthalpy E2 at the end of said fume main linked to the intake of the FTC, as well as determining the heat losses between the outlet of the BF and the intake of the FTC, these heat losses being at least the sum of line losses PL, which are a function in particular of the temperature and the flow rate of the fumes, and the ambient temperature, preferably also measured continuously, and an estimate of losses by infiltrations of ambient air PA, and determining the appearance of an outbreak of fire in said fume main if an energy input X, such that: X=E2−E1+PL+PA, is positive.

Implementation of such fire outbreak detection is significantly facilitated when the BF comprises, as described above, temperature detection in each of the exhaust pipes of the exhaust manifolds. In this case, the temperature of the combustion fumes at the outlet of the BF, i.e. at the intake of the fume main, can be an average, optionally weighted according to the flow rates of fumes in the pipes, of the measured temperatures in these exhaust pipes; this weighted average of the temperatures of the pipes giving a sufficiently accurate image of a so-called exhaust temperature, corresponding to the temperature of the fumes at the intake of an exhaust manifold in the fume main.

However, as the flow rate and the temperature of the fumes are known in each exhaust pipe, the method of the invention advantageously comprises moreover a step consisting of considering that the enthalpy E1 of the baking fumes at the outlet of the BF is equal to the sum of the enthalpies of the baking fumes extracted from the exhaust manifolds in operation on the BF.

Moreover, the method of the invention also comprises at least one step of emitting at least one alarm, in order to initiate at least one activity to inspect and/or protect said ring main, if the energy input X relating to a possible outbreak of fire in the fume main is greater than at least one positive threshold, making it possible to overcome inaccurate measurements and interference linked to transitory phases of operation of the BF and/or of the FTC, such as fire switching, crossovers, or fire immobilization in the BF.

Similarly to the monitoring over time of the progress of the percentage infiltration gradient, in terms of leak detection, the fire outbreak detection according to the method of the invention can advantageously comprise moreover, at least one step of monitoring over time of the progress of the gradient of the energy input (X), measured at least periodically, and generating a fire alarm indicating a critical energy input gradient if the energy input gradient is positive and increasing over a period of monitoring during which successively calculated values of X are stored chronologically and mutually compared.

It is understood that the method of the invention, both for detection of leaks by infiltration of ambient air and for detection of an outbreak of fire in the fume main, can be implemented without the necessity for additional measurement and recording equipment to that already installed in the BF and FTC of the state of the art, set out above, apart from the installation of a fume temperature detector at the intake of the FTC if the latter is not already in place, in order to facilitate calculation of the enthalpy of the combustion fumes at the outlet of the fume main.

The physical quantities considered in the implementation of the method according to the invention can be determined, by measurement and/or by calculation, on the basis of parameters already measured and recorded by the control systems of the BF and the FTC of the known types set out above in order to monitor and control their respective functions.

Consequently, the monitoring method according to the invention consists moreover of using information exchanged and/or transmitted from any one to another of at least one control and regulation system of the BF and at least one monitoring and control system of the FTC, relative to the flow rate and/or the temperature and/or the enthalpy of the baking fumes, at the intake of the FTC and/or at the outlet of the BF, in particular at the level of each exhaust manifold or each exhaust pipe of the BF, in order to provide monitoring of the condition of said fume main, optionally the emission of at least one leak and/or fire detection signal, and/or at least one alarm, by at least one of said control systems, and/or at least one command for protection of the BF and/or the FTC, and/or ensuring the safety of its operation.

BRIEF DESCRIPTION OF THE DRAWINGS

Other advantages and characteristics of the invention will become apparent from the non-limitative description given below of embodiments described with reference to the attached drawings, in which.

DETAILED DESCRIPTION OF THE DISCLOSURE

For monitoring the condition of the fume main 20-20', the method of the invention proposes firstly to detect the leaks in this fume main 20-20', by infiltration of ambient air. To this end, a first step of this method consists of comparing the flow rate of the baking fumes measured at the outlet of the BF 1 with the flow rate of the baking fumes measured at the intake of the FTC 23, i.e. at the intake of the cooling tower 24, so as to be able to monitor automatically the tightness level of the fume main 20-20'.

If ΔQ denotes the possible flow rate of ambient air entering by infiltration into the fume main 20-20', this flow rate ΔQ can be defined by the following formula (1): $\Delta Q = Q_{ectf} - Q_{sfac}$, where $Q_{ectf}$ is the standardized flow rate of the fumes at the intake of the FTC 23, i.e. the flow rate measured by the flow meter 28 upstream of the cooling tower 24, at the downstream end of fume main 20-20', and $Q_{sfac}$ is the standardized flow rate of the fumes at the outlet of the BF 1.

This flow rate $Q_{sfac}$ can easily be measured, due to the fact the measurement instrumentation already in place in the known BF 1 set out above and necessary for the normal control of the latter, in particular using the flow meters 12 and temperature detectors (thermocouples) 13 installed in the exhaust pipes 11a of the exhaust manifolds 11 of the BF 1, and this flow rate $Q_{sfac}$ is equal to the sum of the flow rates of the baking fumes at the outlet of the exhaust manifolds 11 in operation in the BF 1, the output flow rate of each exhaust manifold 11 in operation being itself the sum of the output flow rates of all the exhaust pipes 11a of this manifold 11, such that if nf is the number of fires in operation in the BF 1, and nc is the number of heating flue walls 6 per chamber 2 of the BF 1, and if Qfc is the standardized flow rate of heating flue wall 6 n° C. of fire n° F., the output flow rate $Q_{sfac}$ can be given by formula (2):

$$Qsfac = \sum_{f=1}^{f=nf} \sum_{c=1}^{c=nc} (Qf1 \ldots Qfc).$$

The monitoring and control system 44 of the BF 1 receives signals, via a communication network 45 and 46, representing the flow rates Qfc and temperatures Tfc of the baking fumes at the nf×nc exhaust pipes 11a of the exhaust manifolds 11 in operation in the BF 1, and, using programmable logic controllers of the system 44 as well as optionally, the exhaust manifolds 11, the system 44 can optionally receive from each exhaust manifold 11 in operation, an output flow rate signal of this manifold 11, equal to the sum of the elementary flow rates of the pipes 11a for this manifold 11, i.e. for fire n° 1, the flow rate $\Sigma(Q1,1 \ldots Q1,nc)$, and for the last fire in operation having n° nf, the flow rate $\Sigma(Qnf,1 \ldots Qnf,nc)$, then calculate the sum of the output flow rates of the manifolds 11 in operation, i.e. the output flow rate $Q_{sfac}$ of the BF 1.

For its part, the control system 47 of the FTC 23 receives a signal from the flow meter 28 representing the input flow rate into the FTC 23 $Q_{ectf}$.

The two control systems 44 and 47 communicating with each other by the transmission line 48, they can exchange this information relating to the flow rate $Q_{ectf}$ and the flow rate $Q_{sfac}$ equal to the sum of the output flow rates of the manifolds 11 in operation, by formula (2) given above, and one and/or the other of the two control systems 44 and 47 can calculate the potential flow rate $\Delta Q$ of ambient air infiltrating by aspiration into the fume main 20-20' under negative pressure.

Simply put, this flow rate $\Delta Q$, when it is non-zero, can be compared with at least one infiltration flow rate threshold, or, preferably, to several progressively increasing threshold values, such that if $\Delta Q$ exceeds one of these thresholds, one and/or the other of the two control systems 44 and 47 having recognized this condition can emit an alarm signal, the criticality of which increases, the more $\Delta Q$ exceeds a high threshold value.

As an alternative to this comparison of $\Delta Q$ to at least one infiltration flow rate threshold, or cumulatively with this step, the method of the invention can also comprise a step consisting of estimating the percentage infiltration of air (PI) into the fume main 20-20' using the following formula (3):

$$PI = \left(\frac{\Delta Q}{Qsfac}\right) \times 100.$$

Calculating this estimated percentage infiltration of air does not present any difficulty to one and/or the other of the two control systems 44 and 47, since the flow rate of infiltrated ambient air $\Delta Q$ is known, as indicated above, together with the flow rate $Q_{sfac}$ of the combustion fumes at the outlet of the BF 1 (see formula (2)).

Depending on the levels of infiltration of ambient air into the fume main 20-20', the control system 44 of the BF 1 and/or the one 47 of the FTC 23 can generate alarms, in order to initiate an activity of inspection and maintenance of the fume main 20-20', and/or an activity respectively to make safe or protect the BF 1 and/or the FTC 23.

In one and/or the other of the two control systems 44 and 47, the calculation of the physical quantities defined by formulae (2), (1) and (3), depending on the values of the appropriate parameters measured as indicated above, can be provided by a detection module incorporated into at least one of the two control systems 44 and 47 and activated automatically and periodically by a timer, for example each month, or each week, for a period of at least one cycle, after a step of validation by operators of a list of the flow meters or flow-rate sensors, the measurements of which can be used for calculating formulae (1) and (2) above.

Such a procedure makes it possible to avoid inaccurate fume flow-rate values that might be due, for example, to the blockage of a flow meter, in particular the venturi tube type, and this procedure has the additional advantage of improving the monitoring of operation.

Moreover, according to the method of the invention, the flow-rate values of infiltrated ambient air $\Delta Q$ and the estimated percentage infiltration of air PI preferably calculated continuously, but at least periodically, are stored chronologically and compared on the one hand, to respective thresholds, and on the other hand, to each-other, in order to provide monitoring over time of the progress of the $\Delta Q$ gradient and the gradient of the percentage infiltration (PI).

In the same way as for the comparison of $\Delta Q$ with at least one threshold, the method can comprise at least one step of comparing the estimated percentage infiltration (PI) of ambient air to at least one infiltration threshold (SI) and generating an alarm if PI is greater than at least one infiltration threshold SI, chosen to represent a level of infiltration that makes it necessary to initiate an activity of inspection and repair or maintenance of the fume main 20-20'.

By way of example, with reference to an infiltration threshold SI=10%, as soon as the measured PI is greater than 10%, a fume main 20-20' leak alarm is activated by one and/or the other of the two control systems 44 and 47.

Moreover, if the monitoring over time of the progress of the gradient of the percentage infiltration PI of ambient air indicates that this gradient is positive and increasing over a representative period for example, at least one of the control systems 44 and 47 activates initiation of an alarm indicating a critical leak gradient.

In the case of a new installation or a renovated installation on which leaks are minimized in an optimal fashion, it can prove very useful to take as a reference the flow-rate values respectively on start-up or re-starting of the BF 1 in order to provide an estimate of the systematic leak measurement error during a period of at least one bake cycle.

As an alternative to leak detection as presented above, or, preferably, consecutively or additionally to this detection, the method of the invention also proposes fire outbreak detection in the fume main 20-20'.

To this end, on the basis on the one hand, of the flow-rate measurements given above for the detection of leaks by infiltration of ambient air, and, on the other hand, by measuring, preferably continuously, but at least periodically at a significant frequency, the temperatures of the combustion fumes at the outlet of the BF 1 and at the intake of the FTC 23, the method of the invention proposes calculating the enthalpy of the combustion fumes at each end of the fume main 20-20'. The ambient temperature is also measured, also preferably continuously, or at least periodically at a sufficiently high frequency for the monitoring over time of ambient temperature to be relevant, and compensating, according to the method of the invention, for the heat losses from the outlet of the BF 1 to the intake of the FTC 23, it is possible to monitor the appearance of a possible outbreak of fire in the fume main 20-20', assuming that such a fire outbreak corresponds to an energy input X expressed by formula (4): X=E2−E1+P, where E1 is the enthalpy of the combustion fumes at the outlet of the BF 1, E2 is the enthalpy of the combustion fumes at the intake of the FTC 23, i.e. at the intake of the cooling tower 24, P represents the heat losses, which are the sum of an estimate of losses by infiltrations of ambient air PA, that can be determined from knowledge of the above-mentioned $\Delta Q$ and/or percentage infiltration PI, and line losses in the fume main 20-20', and more precisely between the outlet of the exhaust manifolds 11 in operation and the intake of the cooling tower 24, these line losses being a function not only of the ambient temperature and the temperature and flow rate of the combustion fumes, but also of the dimensions and the thermal insulation of the fume main 20-20', and X corresponds to the energy input of a possible fire outbreak, and is therefore normally equal to 0 (X=E2−E1+PL+PA).

The flow rates of the combustion fumes at the outlet of the BF 1 and at the intake of the cooling tower 24 can be measured and recorded as indicated above, at the levels of the exhaust pipes 11$a$ of the exhaust manifolds 11 in operation, for the BF 1, and by the flow meter 28 upstream of the tower 24 for the FTC 23.

If the FTC 23 is not equipped with a combustion fume temperature detector at the intake of the FTC 23, the FTC 23 must be provided with such a temperature detector 29, as shown in FIG. 3, immediately upstream of the flow meter 28, at the downstream end of the fume main 20-20'.

Thus, the enthalpy E2 of the combustion fumes at the intake of the cooling tower 24 can easily be determined by the control system 47 of the FTC 23 on the basis of the flow meter 28 and the temperature detector 29.

With reference to the temperature of the combustion fumes at the outlet of the BF 1, it is assumed, according to the invention, that this temperature is a fume exhaust temperature TASP measured at the outlet of each of the exhaust manifolds 11 in operation, i.e. where this manifold 11 opens out into the corresponding portion of the fume main 20, as shown in FIG. 2.

This exhaust temperature TASP can be provided by a temperature detector installed at this level in the corresponding exhaust manifold 11, or by a weighted average of the temperatures of the combustion fumes provided by the temperature detectors 13 installed in the exhaust pipes 11$a$ of this manifold 11. The weighting of these temperature measurements is carried out according to the individual flow rates of the combustion fumes measured in the flow meters 12 of these exhaust pipes 11$a$.

In a variant, the enthalpy E1 of the combustion fumes at the outlet of the BF 1 can be equal to the sum of the enthalpies of the combustion fumes at the outlet of each of the exhaust manifolds 11 in operation, the enthalpy for each manifold 11 being itself the sum of the individual enthalpies at the level of the different exhaust pipes 11$a$ of this manifold 11, since the flow-rate and temperature values pertaining to each exhaust pipe 11$a$ are known, i.e., for the first fire, temperatures T1,1 ... T1,nc and corresponding flow rates Q1,1 ... Q1,nc, and for the second and last fire in FIG. 3, Tnf,1 .... Tnf,nc and the corresponding flow rates Qnf,1 .... Qnf,nc.

Also in a variant, the flow rate of the combustion fumes at the outlet of the BF 1 can be determined according to formula (2) above, and the temperature of the fumes at the outlet of the BF 1 can be measured in the fume main 20, using at least one temperature detector installed at this level, and communicating with the control system 44.

As for the detection of leaks set out above, it is possible, according to the method of the invention, to compare the energy input X relating to a possible outbreak of fire in the fume main 20-20' with at least one positive threshold, having a value chosen so as to make it possible to avoid measurement inaccuracy and interference linked to transitory phases of operation of the BF 1 and/or the FTC 23, so that, if X is greater than this threshold, at least one alarm is emitted by at least one of the control systems 44 and 47, in order to initiate activity to inspect and/or protect the fume main 20-20'. For example, transitory phases of operating the BF 1 can be fire switching, crossovers and fire immobilization.

In the BF 1, fire switching is an operation of fire advance from a chamber 2 to the chamber 2 immediately downstream with respect to the direction of the fumes, and during which the exhaust manifold 11 of the corresponding fire is disconnected then reconnected to the fume exhaust fume main 20. It is understood that fire switching generates a drop in the temperatures of the fumes, as well as variations in the exhaust flow rates.

A crossover is a configuration or situation during which a fire is distributed over the two sections 1$a$ and 1$b$ of the BF 1, i.e. some of the manifolds and ramps 11 to 19 of this fire are above chambers 2 of a section 1$a$ or 1$b$, and other manifolds and ramps are above chambers 2 of the other section 1$b$ or 1$a$. This "fire", i.e. this set of manifolds and ramps, is therefore subject to heat losses and additional pressure losses corresponding to the passage and mixing of fumes in the crossover 10 concerned. During a crossover, the flow rates of the fumes and the temperature gradients can be reduced.

A fire immobilization corresponds to a specific procedure allowing fire advance to be stopped and the manifolds and ramps 11 to 19 of a fire to be immobilized on the same chambers 2 for a period of up to several days. This procedure implements a substantial reduction in the exhaust flow rates, a stoppage of the blowing and cooling areas, as well as a limitation of the injection of fuel in the heating area.

Consequently, during a fire immobilization, the temperature and the flow rate of the fumes at the outlet of the BF 1 and at the intake of the FTC 23 are very significantly reduced.

It is of course also recommended to ensure, as for the estimated percentage infiltration of air PI mentioned above, monitoring over time of the progress of the gradient of the energy input X, preferably measured continuously and at least periodically, and over a given observation period, to discover if the energy input gradient is positive and increasing by making a comparison between the successively-calculated values of X stored chronologically, in order to generate a fire alarm if a critical energy input gradient is detected.

These operations of comparison with thresholds and/or monitoring over time of the progress of the gradient of the energy input X can also be carried out by one and/or the other of the two control systems 44 and 47, which mutually transmit and exchange the corresponding information, in terms of flow rate, temperature, enthalpy, estimated percentage infiltration of air, energy input and gradient of at least some of these variables, for the baking fumes at the intake of the FTC 23 and/or the outlet of the BF 1, and in particular at the level of each exhaust manifold 11 or even each exhaust pipe 11$a$ of the BF 1, in order to provide monitoring of the condition of the fume main 20-20', and if applicable, emission of at least one leakage and/or fire outbreak detection signal, at least one alarm and/or at least one control for protecting or making safe the BF 1 and/or the FTC 23.

The invention claimed is:

1. A method of monitoring the condition of an exhaust fume main connecting each exhaust manifold of a baking furnace (BF) for carbonaceous blocks, to a fume treatment centre (FTC), intended for scrubbing the baking fumes originating from the BF, which is a baking furnace of the type known as a "ring" furnace from which said baking fumes are extracted by at least one exhaust manifold of the BF and collected in said fume main conveying the fumes to said FTC, the method comprising at least one step of detecting an outbreak of fire in said fume main.

2. The method according to claim 1, wherein a detection of an outbreak of fire in said fume main comprises at least one step of measuring, flow rates and temperatures of said fumes at each exhaust manifold of the BF and at an intake of the FTC, and calculation of an enthalpy E1 at an end of said fume main connected to an outlet of the BF and an enthalpy E2 at an other end of said fume main connected to said intake of the FTC, as well as determining heat losses P between said outlet of the BF and said intake of the FTC, and determining the appearance of an outbreak of fire in said fume main if an energy input X, such as: X=E2−E1+P, is positive.

3. The method according to claim 2, wherein said heat losses P are at least the sum of line losses PL, which are a function in particular of the temperature and flow rate of said fumes and the ambient temperature, and of an estimate of losses by infiltration of ambient air PA into said fume main, such that X=E2−E1+PL+PA.

4. The method according to claim 2 comprising moreover a step consisting of considering that said enthalpy E1 of said baking fumes at said outlet of the BF is equal to the sum of the enthalpies of said baking fumes extracted from said exhaust manifolds in operation on the BF.

5. The method according to claim 2 comprising moreover at least one step of emitting at least one alarm, in order to initiate at least one activity of inspecting and/or protecting said fume main, if said energy input X relating to a possible fire in the fume main is greater than at least one positive threshold, making it possible to avoid inaccurate measurements and interference linked to transitory phases of operation of one at least of the BF and/or the FTC.

6. The method according to claim 2 comprising moreover at least one step of monitoring over time of the progress of the gradient of said energy input, measured at least periodically, and generating a fire alarm indicating a critical energy input gradient if said the energy input gradient is positive and increasing over a period of monitoring during which successively-calculated values of X are chronologically stored and mutually compared.

7. The method according to claim 1 comprising moreover at least one step of detecting leakage consisting of unwanted intakes of ambient air into said fume main, said leak detection comprising at least one step of comparison of measured fume flow rates, on the one hand, at an outlet of the BF, and on the other hand, at an intake of the FTC, and deducing any flow of air $\Delta Q$ entering by infiltration into said fume main by calculating the difference between said measured flow rates, such that: $\Delta Q = Q_{ectf} - Q_{sfac}$, where $Q_{sfac}$ is the standardized flow rate of said fumes at said outlet of the BF and $Q_{ectf}$ is the standardized flow rate of said fumes at the intake of said FTC.

8. The method according to claim 7, comprising at least one step of measuring $Q_{sfac}$ consisting of adding standardized flow rates of said fumes measured in said exhaust pipes of said exhaust manifolds of all fires of the BF that communicate with heating flue walls of chambers of the BF, such that:

$$Qsfac = \sum_{f=1}^{f=nf} \sum_{c=1}^{c=nc} (Qf1 \ldots Qfc),$$

where nf is the number of fires in operation in the BF, nc is the number of heating flue walls per chamber of the BF, and Qfc is the standardized flow rate of heating flue wall n° C. of fire n° F.

9. The method according to claim 7 wherein the detection of leaks on said fume main comprises at least one step of estimating a percentage infiltration (PI) of ambient air in said fume main by the formula:

$$PI = \left(\frac{\Delta Q}{Qsfac}\right) \times 100.$$

10. The method according to claim 9, comprising moreover, at least one step of comparing said estimated percentage infiltration (PI) of ambient air with at least one threshold of infiltration (SI), and generating an alarm when said estimated percentage of infiltration (PI) is greater than at least one threshold of infiltration (SI) representing a level of infiltration at which it would be necessary to initiate an activity of inspection, maintenance or repair of the fume main.

11. The method according to claim 9, comprising moreover at least one step of monitoring over time of a progress of the gradient of said percentage infiltration (PI) of ambient air, measured at least periodically, and generating an alarm indicating a leak gradient if said percentage infiltration gradient is positive and increasing over a period of monitoring during which successively-calculated PI values are chronologically stored and mutually compared.

12. The method according to claim 7 comprising moreover at least one step of estimating a systematic leak measurement error during a period of at least one bake cycle, taking as reference flow-rate values on start-up or restarting of the BF in the case respectively of a new installation or a renovated installation, on which leaks are optimally minimized.

13. The method according to claim 1 comprising in addition, at least one step of using information exchanged and/or transmitted from any one to another of at least one control and regulation system of the BF and at least one monitoring and control system of the FTC, relative to at least one parameter selected in the group comprising the flow rate the temperature and the enthalpy of said baking fumes, at the intake of the FTC and/or at the outlet of the BF in order to provide at least one of monitoring the condition of said fume main, the optional emission of at least one leak detection and/or fire outbreak signal, at least one alarm, by at least one of said control systems at least one command for protection of the BF and/or the FTC, and making safe the operation of one at least of the BF and FTC.

* * * * *